April 18, 1944.        J. E. PRIEST        2,346,997
VOLTAGE REGULATOR
Filed May 31, 1940
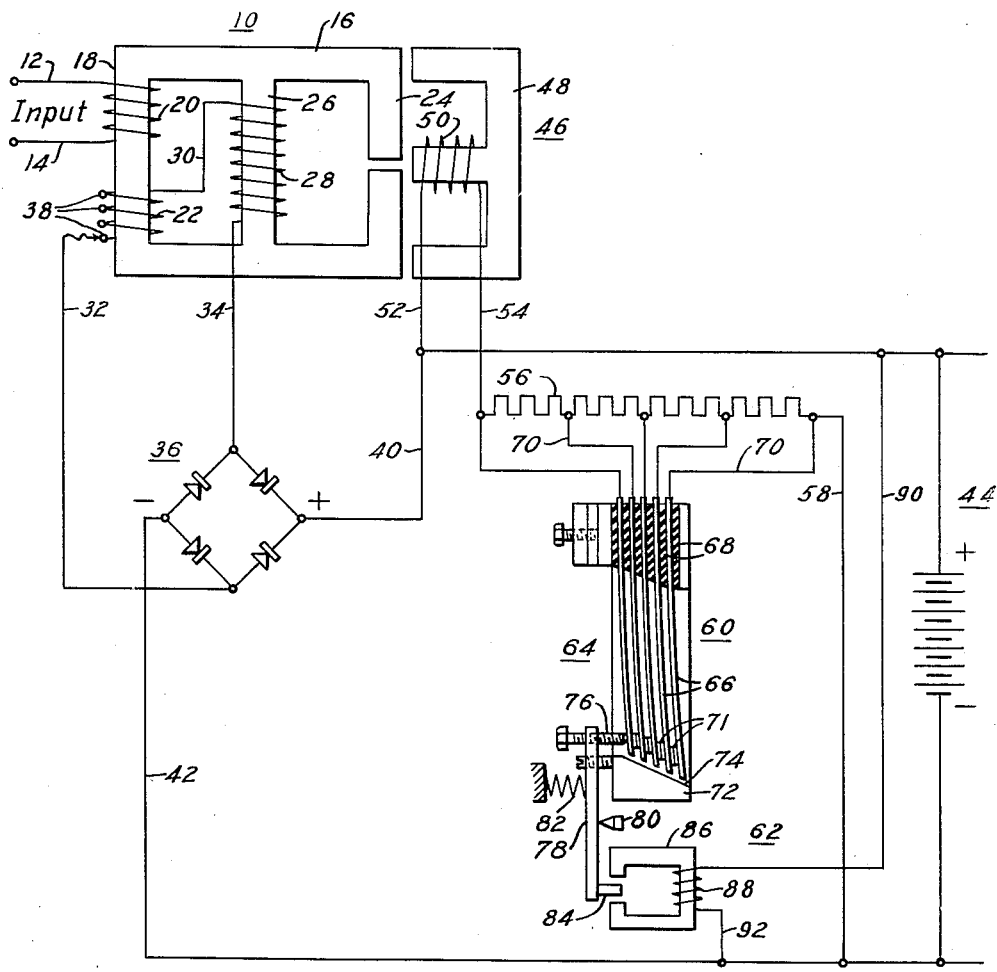
WITNESSES:
INVENTOR
John E. Priest.
BY
ATTORNEY Patented Apr. 18, 1944

2,346,997

UNITED STATES PATENT OFFICE 2,346,997

VOLTAGE REGULATOR

John E. Priest, Wilkinsburg, Pa., assignor to Westinghouse Electric & Manufacturing Company, East Pittsburgh, Pa., a corporation of Pennsylvania Application May 31, 1940, Serial No. 338,138

2 Claims. (Cl. 175—363)

This invention relates to a voltage regulator adapted to maintain substantially constant the voltage of a direct current load supplied from an alternating current source.

An object of this invention is to provide an improved system and apparatus which will function in response to changes in the voltage of a direct current load to so regulate the voltage of an alternating current supply circuit as to maintain the voltage of the direct current load substantially constant.

A more specific object of this invention is to provide for controlling and directing the flow of alternating current flux in a transformer to control the alternating current voltage delivered to a rectifying device to thereby control the direct current voltage delivered from the rectifying device.

Other objects and advantages of this invention will be apparent from the following description when taken in conjunction with the accompanying drawing, the single figure of which is a diagrammatic view of the improved apparatus and system embodying the features of this invention.

Referring to the drawing, the invention is illustrated by reference to a battery charging system. In the system a transformer 10 is electrically connected as by means of conductors 12 and 14 to a source of supply of alternating current (not shown). The transformer 10 has a three-legged core member 16 one of the external legs 18 of which carries a primary winding 20 and a secondary winding 22, and the other external leg 24 of which has an air gap provided therein. The central leg 26 of the core member carries a winding 28 so connected by lead 30 to the secondary winding 22 that an increase in the alternating current flux traversing the central leg 26 effects an increase in the voltage delivered by the windings 22 and 28.

The secondary windings 22 and 28 are electrically connected by conductors 32 and 34 to a rectifying device 36 which, in the present instance, is illustrated as being a Rectox unit. In order to adjust the alternating current voltage across the rectifier 36 to give a minimum charging current the turns of the secondary winding 22 are provided with a plurality of taps 38 whereby the conductor 32 can be connected to different taps to vary the amount of the secondary winding 22 which is electrically connected in circuit with the rectifier 36. The rectifier 36 is electrically connected by conductors 40 and 42 to deliver direct current to a battery 44, the voltage of which it is desired to maintain substantially constant.

Referring again to the transformer 10, it is to be noted that when the primary winding 20 is electrically connected to an alternating current source of supply, that an alternating current flux flows through the yoke and external leg portions of the core member 16, very little if any of the flux flowing through the central leg 26. Thus as long as the normal magnetic circuit of the transformer 10 is undisturbed, a substantially constant alternating current voltage may be measured across the rectifier 36. However, upon the occurrence of a change in the voltage across the battery 44, it is desired to effect a change in the alternating current voltage across the rectifier 36.

As illustrated, an inductive device 46 is inductively associated with the core member 16 of the transformer for controlling and directing the flow of alternating current flux therein. The inductive device 46 comprises an E-shaped core member 48 having a direct current winding 50 carried on the central leg thereof, and which, when energized, will control or direct the flow of alternating current flux in the core member of the transformer. The winding 50 is electrically connected by conductor 52 to conductor 40 and by conductor 54 through a variable resistor 56 and conductor 58 to conductor 42.

As illustrated, the variable resistor 56 comprises one of the elements of a rheostatic controller 60 for controlling the current which flows through the direct current winding 50 to thereby control the ampere turns of the winding and the degree of direct current flux saturation in the external leg 24 of the core member of the transformer 10. In order to control the amount of the variable resistor 56 which is in circuit with the direct current winding 50, a control unit comprising a magnetic structure 62 and the leaf spring assembly 64 is provided and so associated with the resistor 56 and the conductors 40 and 42 as to effectively control the shunting of different portions of the resistor 56.

The leaf spring assembly 64 corresponds in structure to that disclosed in the copending application of C. R. Hanna et al. Serial No. 203,876, filed April 23, 1938, for Regulators, and assigned to the same assignee as this application. Without going into a detailed discussion of the leaf spring assembly 64, it comprises a plurality of leaf springs 66 arranged in a stack having their fixed ends insulated from each other by layers 68 of fish paper or other suitable insulating material and connected by conductors 70 to a plurality of points or taps along the variable resistor 66. The opposite ends of the leaf springs 66 carry suitable contact members 70 and are free to move and are biased into engagement with a stop 72 of any suitable insulating material having a sloping surface 74 for limiting their motion in one direction and for spacing the free ends of the spring leaves 66 out of circuit closing engagement with one another except when moved from engagement with the stop 72 by the driving element 76 carried on a movable arm 78 that is actuated as will be explained more fully hereinafter.

In practice the stop 72 is so positioned on the supporting base of the assembly and with respect to the ends of the leaf springs 66 that the springs are brought against the stopping surface 74 with a slight loading or biasing force and are accurately spaced from one another at their free ends regardless of a lack of straightness of the individual leaves 66. Although not shown in the drawing, the stop 72 is usually disposed for movement about a given point on the supporting base of the assembly to change the angle of the sloped stopping surface 74 relative to the ends of the spring leaves 66 whereby the spacing between the leaves will be increased by a counterclockwise movement of the stop 72 or decreased by a clockwise movement of the stop. Such arrangement of the spring leaves 66 and the stops 72 permits a free unrestricted movement of the spring leaves 66 in a direction away from the sloping surface 74 of the stop 72.

The magnetic structure 62 employed in conjunction with the spring leaf assembly 64 for controlling the movement of the spring leaves 66 can be of any suitable arrangement or, as illustrated, the arrangement of the magnetic structure for mounting and actuating the movable arm 78 may correspond to that disclosed in copending application of Ralph A. Geiselman, Serial No. 219,217, filed July 16, 1937, for regulators and assigned to the same assignee of this application. The magnetic structure 62 diagrammatically illustrated is provided with a pivot 80 about which the movable lever arm 78 is adapted to move against the bias of a spring 82 in accordance with the force exerted on an armature 84 carried by the movable arm 78 and positioned within an air gap of a stationary core 86 of a magnetic circuit energized by a winding 88. The winding 88 is so connected by conductors 90 and 92 as to be energized in accordance with the voltage across conductors 40 and 42. Although illustrated in the drawing for an extreme condition of the circuit, the magnetic structure 62 and leaf assembly 64 are usually so arranged that for a given voltage across conductors 40 and 42 the magnetic pull on the armature 84 balances the force of the spring 82 to maintain the lever arm 78 in such a position as to permit a majority of the leaf springs 66 to be spaced apart, thereby connecting a large amount of the resistor 56 in circuit with the direct current winding 50 whereby the degree of saturation of direct current flux flowing through the external leg of the core member 16 is a minimum.

In operation, assuming that the battery voltage has decreased below a fully charged condition and that rectifying device 36 is delivering a minimum charging current to the battery, the winding 88 of the magnetic structure 62 is so deenergized that the spring 82 forces the driving element 76 against the leaf springs 66 to cause their free ends to move to a circuit closing position. Under the condition as illustrated with the leaves 66 biased to their circuit closing position, all portions of the variable resistor 56 are short circuited and maximum current is delivered to the direct current winding 50 from the rectifying device 36. Under this condition the ampere turns of the direct current winding 50 are a maximum and the direct current flux through the external leg 24 of the core member 16 and the E-shaped core member 48 of the inductive device 46 becomes a maximum, thereby effectively blocking off the flow of alternating current flux from the external leg 24 and directing it to and through the central leg 26 of the transformer 10. With this increase of alternating current flux traversing the winding 28, an increase in the alternating current voltage delivered to the rectifying device 36 is effected with the result that the direct current voltage across the conductors 40 and 42 approaches the voltage desired across the battery 44.

As this voltage approaches or reaches the normal desired voltage, the winding 88 of the magnetic structure 62 becomes so energized as to actuate the movable arm 78 about the pivot 80 to cause a release of the force applied to the spring leaves 66 and permit their normal biasing force to cooperate with the stop 72 to effect the separation of the leaves and remove the short circuit from the portions of the variable resistor 56 to connect the portions in circuit with the winding 50 to thereby decrease the current flowing in the direct current winding 50. As the current flowing through winding 50 is reduced, the direct current flux in the external leg 24 is also reduced and more of the alternating current flux traverses the external leg. With such reduction in the flux traversing the secondary winding 28 a corresponding reduction is effected in the alternating current voltage delivered to the rectifier 36.

When the voltage across the conductors 40 and 42 is increased to the given value which it is desired to maintain, it is found that the winding 88 is so energized as to balance the force of the spring 82 to maintain the energization of the direct current winding 50 substantially constant whereby the alternating current voltage delivered to the rectifier 36 is substantially constant. Any deviation, however, from the desired direct current voltage will effect a similar change in the energization of the winding 88 of the magnetic structure 62 to effectively change the amount of resistor 56 in circuit with the direct current winding 50 to control and direct the flow of the alternating current flux through the central leg 26 of the transformer to control the alternating current voltage output therefrom.

By providing the apparatus and system of this invention, it is quite apparent that the control of the voltage delivered to the direct current load is efficiently effected with a very fine degree of control and with a minimum of equipment. Further, it is found that with this system including the transformer and the controlling inductive device as described, a power factor of 90% is obtained.

Although this invention has been described with reference to a particular system and apparatus, it is, of course, not to be limited thereto except insofar as is necessitated by the prior art and the scope of the appended claims.

I claim as my invention:

1. In a voltage regulator for a direct current load, in combination, a source of alternating current power, a transformer electrically connected to the source of power, a rectifier electrically connected across the transformer, a direct current load electrically connected to the rectifier, a direct current inductive device disposed in inductive relation to the transformer to control the voltage applied to the rectifier, said inductive device being electrically connected to the direct current load, a variable resistor connected in circuit relation with the direct current load and the direct current inductive device for controlling the voltage applied to the inductive device, a plurality of contact members connected to separate points along the resistor, stop means for spacing the contact members when engaged thereby, the stop means being arranged to permit unlimited movement of the contact members away from the stop means, means for biasing the contact members to the positions limited by the stop means, and means responsive to the voltage applied to the direct current load to move the contact members from engagement with the stop to successively short circuit portions of the resistor to control the voltage applied to the inductive device thereby to control the voltage applied to the rectifier.

2. In a voltage regulator for a direct current load, in combination, a source of alternating current power, a transformer electrically connected to the source of power, the transformer having a three legged core member, a primary and secondary winding on one of the external legs of the core member, a secondary winding on the central leg of the core member and electrically connected to the secondary winding on said one of the external legs of the core member, a rectifier electrically connected to the secondary windings of the transformer, a direct current load electrically connected to the rectifier, an inductive device comprising an E-shaped core member and a winding on the central leg of the E-shaped core member magnetically associated with the other external leg of the core member of the transformer to control and direct the flow of alternating current flux, the winding of the inductive device being electrically connected to the direct current load, a variable resistor connected in circuit relation with the direct current load and the winding of the inductive device for controlling the voltage applied to the winding, and means responsive to the voltage applied to the direct current load to operate the variable resistor for controlling the voltage applied to the winding of the inductive device thereby to control the flow of alternating current flux in the core member of the transformer and control the voltage applied to the rectifier.

JOHN E. PRIEST.